(12) United States Patent
Roberts

(10) Patent No.: US 6,788,117 B2
(45) Date of Patent: Sep. 7, 2004

(54) METHOD AND APPARATUS FOR GENERATING FREQUENCY-STABLE WAVELETS

(75) Inventor: Richard D. Roberts, Vienna, VA (US)

(73) Assignee: Freescale Semiconductor, Inc, Austin, TX (US)

( * ) Notice: Subject to any disclaimer, the term of this patent is extended or adjusted under 35 U.S.C. 154(b) by 0 days.

(21) Appl. No.: 10/379,587

(22) Filed: Mar. 6, 2003

(65) Prior Publication Data

US 2003/0169828 A1 Sep. 11, 2003

Related U.S. Application Data

(60) Provisional application No. 60/361,717, filed on Mar. 6, 2002.

(51) Int. Cl.[7] .............................................. H03B 19/00
(52) U.S. Cl. ...................... 327/113; 375/130; 375/295; 455/323
(58) Field of Search ................................ 327/113, 100; 375/130, 295; 455/323, 403

(56) References Cited

U.S. PATENT DOCUMENTS

| 4,628,270 | A | 12/1986 | Roberts | 329/360 |
| 6,700,939 | B1 * | 3/2004 | McCorkle et al. | 375/295 |
| 2003/0108133 | A1 * | 6/2003 | Richards | |
| 2004/0066842 | A1 * | 4/2004 | McCorkle | |

OTHER PUBLICATIONS

John K. Proakis, Digital Communications, Fourth Edition, McGraw Hill, pp. 262, and 336–338, (2001, New York).

* cited by examiner

*Primary Examiner*—Tuan T. Lam
(74) *Attorney, Agent, or Firm*—Posz & Bethards, PLC

(57) ABSTRACT

A method is provided for generating a frequency stable wavelet. Initially, a first sine wave is generated having a first frequency. Then, a half sine wave window is generated having a window frequency. The first sine wave and the half sine wave window are then mixed to create the frequency stable wavelet. In this process the sine wave has a frequency greater than half sine wave window so that the half sine wave window covers more than a single sine pulse. The half wave window can be created by generating a second sine wave having a second frequency that is twice the window frequency, and then fully rectifying the second sine wave. The wavelets created in this manner can be used for a variety of purposes, including correlating with a received signal or transmitting as a wireless signal.

27 Claims, 19 Drawing Sheets

METHOD AND APPARATUS FOR GENERATING FREQUENCY-STABLE WAVELETS

CROSS-REFERENCE TO RELATED PATENT DOCUMENTS

This application relies for priority on U.S. provisional application serial No. 60/361,717, by Richard D. Roberts, filed Mar. 6, 2002, entitled "A LOW POWER, HIGH RESOLUTION, FREQUENCY STABLE WAVELET GENERATOR FOR ULTRA-WIDE BANDWIDTH COMMUNICATIONS SYSTEMS," the contents of which are hereby incorporated by reference in their entirety.

BACKGROUND OF THE INVENTION

The present invention relates to wireless personal area networks and wireless local area networks. More particularly, the present invention relates to how to generate frequency stable wavelets for transmission in an ultrawide bandwidth device.

UWB Wavelets

UWB systems often use signals that are based on trains of short duration wavelets (also called chips or pulses) formed using a single basic wavelet shape. The interval between individual pulses can be uniform or variable, and there are a number of different methods that can be used for modulating the wavelet train with data for communications.

An important point common to UWB systems is that the individual wavelets are very short in duration, typically much shorter than the interval corresponding to a single bit of information being passed, which can offer advantages in resolving multipath components. In one embodiment, a UWB signal includes a series of wavelets formed according to the following equation:

$$s(t) = \sum_{k=-\infty}^{\infty} a_k p(t - t_k) \quad (1)$$

Here s(t) is the UWB signal, p(t) is the basic pulse shape, and $a_k$ and $t_k$ are the amplitude and time offset for each individual pulse. Because of the short duration of the pulses, the spectrum of the UWB signal can be several gigahertz or more in bandwidth. FIG. 1A shows an exemplary UWB wavelet.

In this example the pulse is a third derivative Gaussian wavelet with a peak-to-peak time ($T_{p-p}$) of a fraction of a fraction of a nanosecond, and a bandwidth of several gigahertz. FIG. 1B shows the frequency response of the wavelet shown in FIG. 1A.

FIG. 2 is a block diagram showing an exemplary wavelet circuit for generating the third derivative Gaussian wavelet of FIG. 1A. As shown in FIG. 2, the wavelet generating circuit 200 includes a Gaussian low pass filter 210 and first through third derivative circuits 220, 230, and 240. The Gaussian low pass filter 210 receives an impulse signal and produces a Gaussian signal p(t) as an output. This Gaussian signal p(t) is provided to the first derivative circuit 220, which outputs a first derivative Gaussian signal p'(t). This first derivative Gaussian signal p'(t) is then provided to the second derivative circuit 230, which outputs a second derivative Gaussian signal p''(t). Finally, the second derivative Gaussian signal p''(t) is provided to the third derivative circuit 240, which outputs a third derivative Gaussian signal p'''(t).

The first, second, and third derivative circuits 220, 230, and 240 are often implemented to provide approximate derivative signals. FIG. 3 is a block diagram showing an exemplary derivative circuit for generating an approximate derivative of an input signal. As shown in FIG. 3, the derivative circuit 300 includes a delay 310, an inverter 320, a summer 330, and a scaling circuit 340.

The delay 310 receives an input signal x(t) and delays it by a delay period π. The inverter 320 then inverts the delayed signal and provides it to the summer 330. The summer 330 receives the inverted delayed signal and the input signal, and adds them together, and the scaling circuit divides the sum by π.

The output of the derivative circuit 300 can thus be described by the following equation:

$$x'(t) = \frac{x(t) - x(t - \tau)}{\tau} \quad (2)$$

which is an acceptable approximation of the derivative of the input signal x(t).

The wavelet output from the wavelet generating circuit 200 is used to carry data for the UWB system. Information is encoded into a series of wavelets that are wirelessly transmitted from a first device to a second device as a wireless signal.

In order to properly decode the incoming signal, the second device uses a correlation circuit. This correlation circuit allows the second device to determine the timing of an incoming signal, and the data encoded in it.

FIG. 4 is a block diagram showing a portion of a wireless receiver according to a preferred embodiment of the present invention. As shown in FIG. 4, the receiver 400 includes a pulse forming network (PFN) and timer 410 and a correlation circuit 420. The correlation circuit further includes a mixer 430 and a decision circuit.

The PFN and timer 410 preferably generates local copies of the wavelets that are the basis of the transmitted signal. (See FIG. 1A). These locally generated wavelets are provided to the correlation circuit 420 and are preferably nearly identical to the wavelets transmitted by the transmitter.

The correlation circuit 420 receives a wavelet stream that has preferably been wirelessly transmitted to the receiver 400, received at an antenna (not shown), and processed by a front end (not shown). The wavelet stream is then mixed in the mixer 430 with the locally generated wavelets to provide a correlation value.

The decision circuit receives the correlation value and uses that value to decode the information in the wavelet stream and to generate certain control signals. For example, during signal acquisition the decision circuit 440 uses the correlation value to generate control signals for the PFN and timer 410 to adjust the phase of the locally generated wavelets to match the phase of the wavelet stream. When a data signal is coming in, the decision circuit 440 uses the correlation value to decode data from the wavelet stream.

FIGS. 5A and 5B are graphs showing the autocorrelation function of the wavelet of FIG. 1A. FIG. 5A shows the autocorrelation in terms of amplitude, while FIG. 5B shows the autocorrelation in terms of dBr. Autocorrelation refers to when the wavelet is correlated with a duplicate of itself, as is done by the mixer 430 during signal acquisition.

The time axis of both of FIGS. 5A and 5B show the relative difference in wavelet starting points, delayed by the amount of time it takes for the mixer 430 to output the correlation value (a little over 400 ps in this embodiment). In the alternative, the autocorrelation graphs could be normalized to zero, setting the maximum points in the curves in FIGS. 5A ands 5B at zero on the x-axis. These maximum points show where the wavelets are perfectly aligned. The remainders of the autocorrelation curves show results for varying degrees of phase shift for the two copies of the wavelet that are being autocorrelated.

However, this open loop method of generating wavelets exhibits poor frequency stability. For example, there is a significant variation in the peak-to-peak time $T_{p-p}$ in wavelets depending upon temperature, component tolerances, etc. This is particularly true for the Gaussian low pass filter 210 and the delays 310 in the first, second, and third derivative circuits 220, 230, and 240. For example, the use of a delay having an LC circuit can cause a $T_{p-p}$ variance of 20% by itself.

FIG. 6 is a graph showing the spectrum variance for the wavelet of FIG. 1A as its peak-to-peak time is varied. In particular, FIG. 6 shows three wavelet spectrum curves: a first spectrum curve 610 in which the peak-to-peak time $T_{p-p}$ is at an ideal value, a second spectrum curve 620 in which the peak-to-peak time $T_{p-p}$ is 20% below the ideal value, and a third spectrum curve 630 in which the peak-to-peak time $T_{p-p}$ is 20% above the ideal value.

As shown in FIG. 6, the spectrum variance between these three curves is significant. For example, the center frequency changes from about 4.5 GHz at an ideal $T_{p-p}$ up to about 7.5 GHz at −20% from the ideal $T_{p-p}$ and down to about 3 GHz at +20% from the ideal $T_{p-p}$. This is an unacceptable variance in many UWB applications.

It is therefore desirable to provide a way of generating wavelets that have a stable frequency over a variety of conditions.

SUMMARY OF THE INVENTION

Consistent with the title of this section, only a brief description of selected features of the present invention is now presented. A more complete description of the present invention is the subject of this entire document.

An object of the present invention is to provide a method of making wavelets that have a stable frequency in a variety of environments, and a circuit for making frequency-stable wavelets.

Another object of the present invention is to provide a correlator that uses a frequency-stable wavelet generation method to achieve improved correlation performance.

These and other objects are accomplished by way of a method for generating a wavelet. This method comprises generating a first sine wave having a first frequency; generating a half sine wave window having a window frequency; and mixing the first sine wave and the half sine wave window to produce a wavelet. In this method, the window frequency is lower than the first frequency.

The half sine wave window may be a positive portion of a sine wave from 0 to 180 degrees, or a negative portion of a sine wave from 180 to 360 degrees. The first frequency is preferably between two and four times the window frequency, and more preferably three times the window frequency.

The step of generating a half sine wave window may further comprise generating a second sine wave having a second frequency; and fully rectifying the second sine wave to form the half sine wave window. In this step, the second frequency is twice the window frequency.

The first and second sine waves are each preferably generated using a phase locked loop circuit.

Also provided is a wavelet generator, comprising: a first sine wave generator for generating a first sine wave having a first frequency; a half sine wave window generator for generating a half sine wave window having a window frequency; and a mixer for mixing the first sine wave and the half sine wave window to produce a wavelet. In this wavelet generator, the window frequency is lower than the first frequency.

The first frequency is preferably between two and four times the window frequency, and more preferably three times the window frequency.

The half sine wave window generator may further comprise a second sine wave generator for generating a second sine wave having a second frequency; a full wave rectifier for fully rectifying the second sine wave to form the half sine wave window the second frequency is twice the window frequency.

The first and second sine wave generators are preferably each phase locked loop circuits.

A method for generating wavelets is also provided. This method comprises generating a first sine wave having a first frequency; generating a series of half sine wave windows, having a window frequency; and mixing the first sine wave and the half sine wave windows to produce a series of wavelets. In this method the window frequency is lower than the first frequency.

The first frequency is preferably between two and four times the window frequency, and more preferably three times the window frequency.

The step of generating a half sine wave window may further comprise: generating a second sine wave having a second frequency; and fully rectifying the second sine wave to form the series of half sine wave windows. In this method, the second frequency is twice the window frequency.

The first and second sine waves are preferably each generated using a phase locked loop circuit.

A method is also provided for correlating incoming wavelets with locally generated wavelets. This method comprises: generating a first sine wave having a first frequency; generating a series of half sine wave windows, having a window frequency; mixing the first sine wave and the half sine wave windows to produce a locally-generated wavelet stream; receiving an incoming wavelet stream; and mixing the locally-generated wavelet stream with the incoming wavelet stream to generate a correlation value. In this method, the window frequency is lower than the first frequency.

The first frequency is preferably between two and four times the window frequency, and more preferably three times the window frequency.

The step of generating a half sine wave window may further comprise: generating a second sine wave having a second frequency; and fully rectifying the second sine wave to form the series of half sine wave windows. In this step, the second frequency is twice the window frequency.

The first and second sine waves are preferably each generated using a phase locked loop circuit.

A correlator is also provided, comprising: a first sine wave generator for generating a first sine wave having a first frequency; a second sine wave generator for generating a second sine wave having a second frequency; a half sine wave window generator for generating a series of half sine wave windows having a window frequency; a first mixer for mixing the first sine wave and the series of half sine wave windows to produce a locally-generated wavelet stream; and a second mixer for mixing the locally-generated wavelet stream with an incoming wavelet stream to generate a correlation value. In this correlator, the second frequency is lower than the first frequency.

The first frequency is preferably between two and four times the window frequency, and more preferably three times the window frequency.

The half sine wave window generator may further comprise: a second sine wave generator for generating a second sine wave having a second frequency; and a full wave rectifier for fully rectifying the second sine wave to form the series of half sine wave windows. In the half sine wave window generator, the second frequency is twice the window frequency.

The first and second sine waves are preferably each generated using a phase locked loop circuit.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which.

DETAILED DESCRIPTION OF THE PREFERRED EMBODIMENTS

Figure 1A:
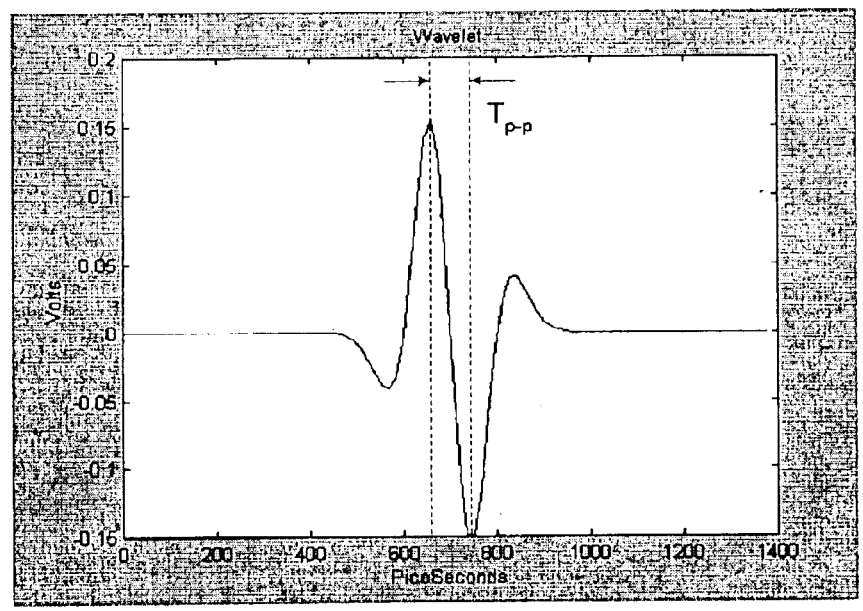
FIG. 1A shows an exemplary UWB wavelet.
Figure 1B:
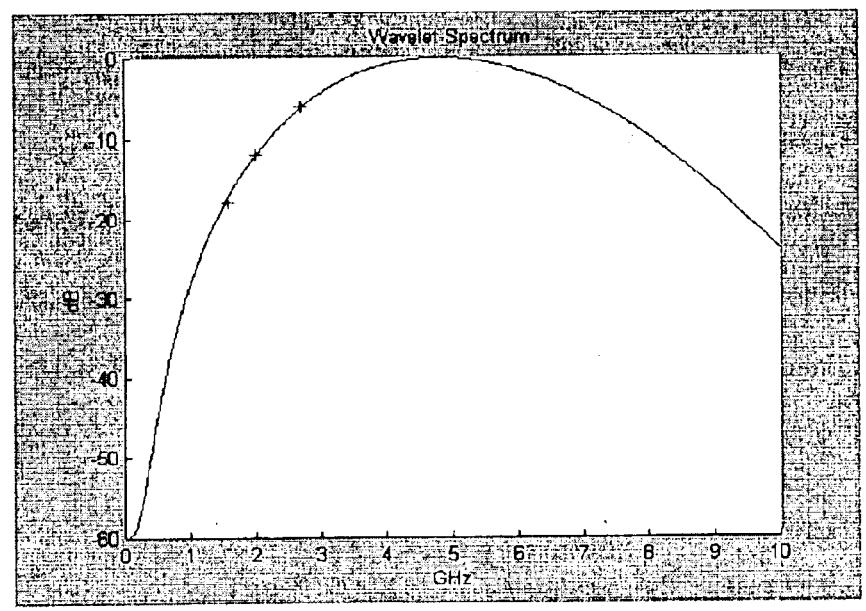
FIG. 1B shows the frequency response of the wavelet shown in FIG. 1A
Figure 2:
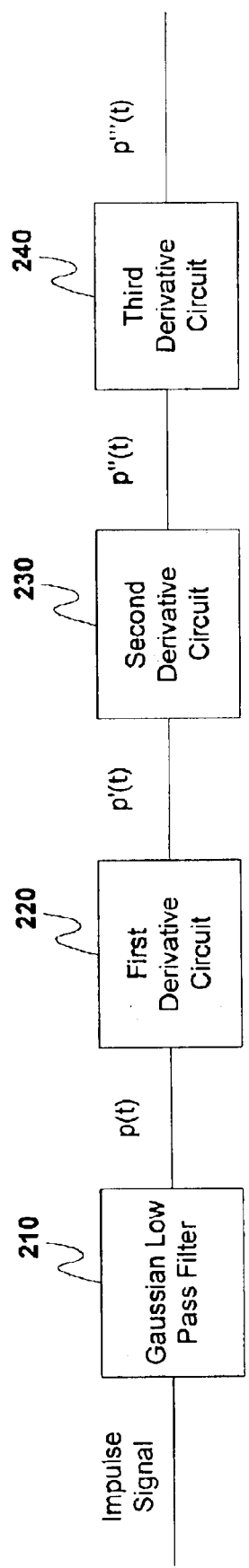
FIG. 2 is a block diagram showing an exemplary wavelet circuit for generating the third derivative Gaussian wavelet of FIG. 1A.
Figure 3:
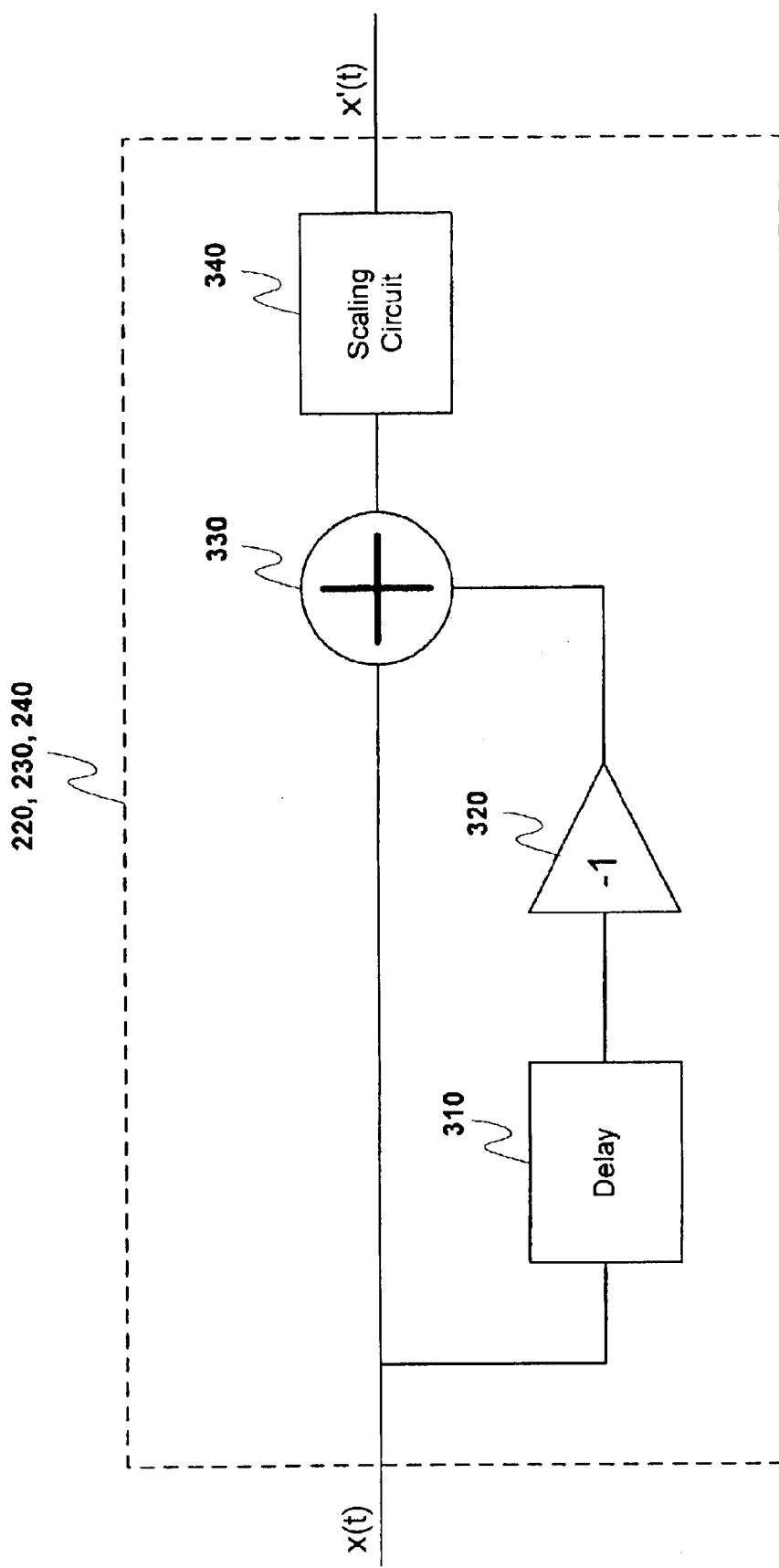
FIG. 3 is a block diagram showing an exemplary derivative circuit for generating an approximate derivative of an input signal.
Figure 4:
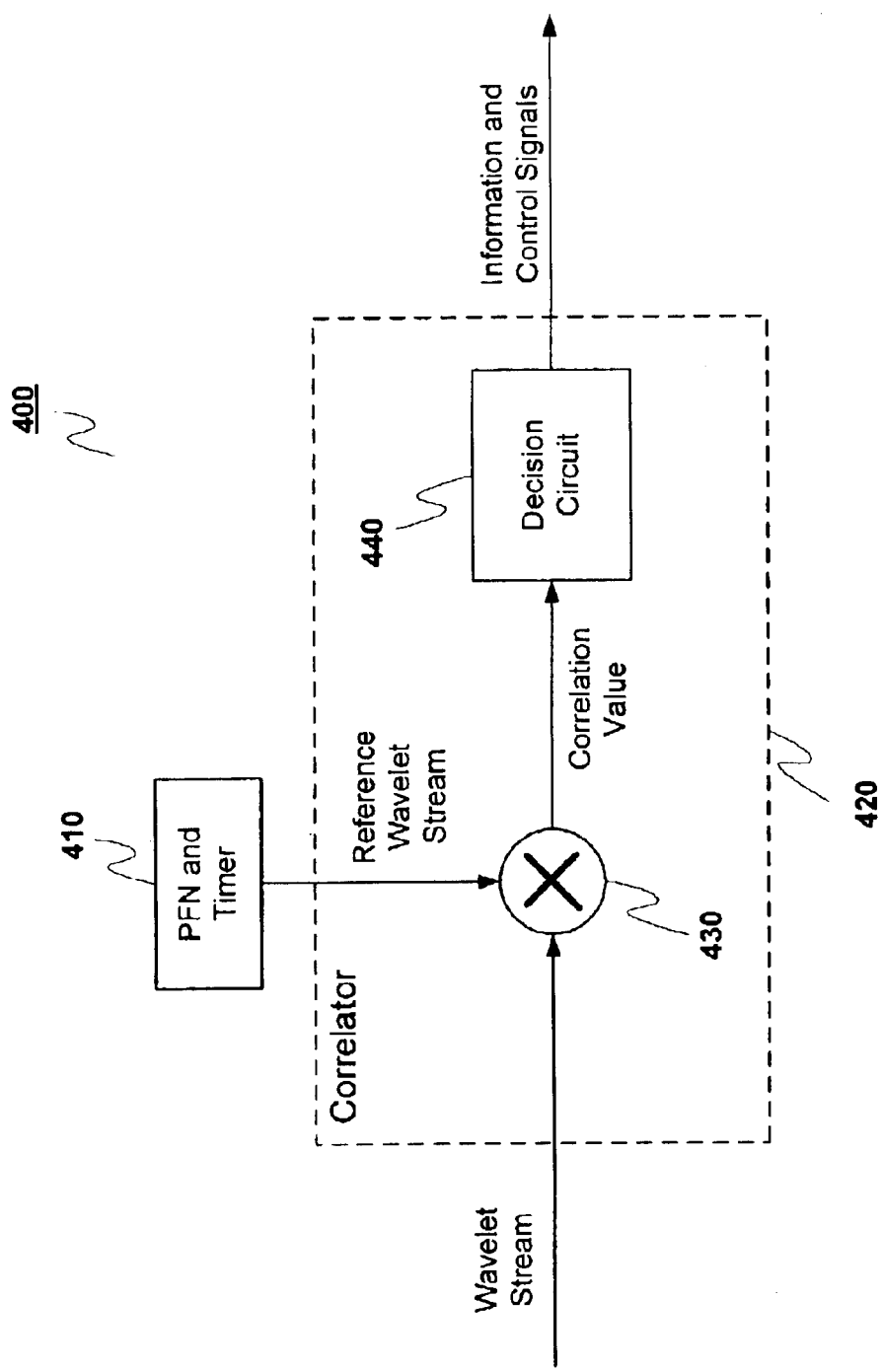
FIG. 4 is a block diagram showing a portion of a wireless receiver according to a preferred embodiment of the present invention.

Preferred embodiments of the present invention will now be described with reference to the drawings. Throughout the several views, like reference numerals designate identical or corresponding parts.

As stated in the BACKGROUND OF THE INVENTION, it is desirable to provide a way of generating wavelets that have a stable frequency over a variety of conditions. One way to do this is to start with a frequency stable sine wave generated by a phase lock loop circuit (such as the reference frequency in an IC) and use that to generate a wavelet.

Now as shown in FIG. 1A, a third derivative Gaussian wavelet bears some similarity to sine wave, although it is not identical. For example, it is somewhat attenuated at its sides. But if one or more cycles of a sign wave were attenuated by a proper window curve, then that windowed sine wave would look reasonably similar to the third derivative Gaussian wavelet.

Figure 7A:
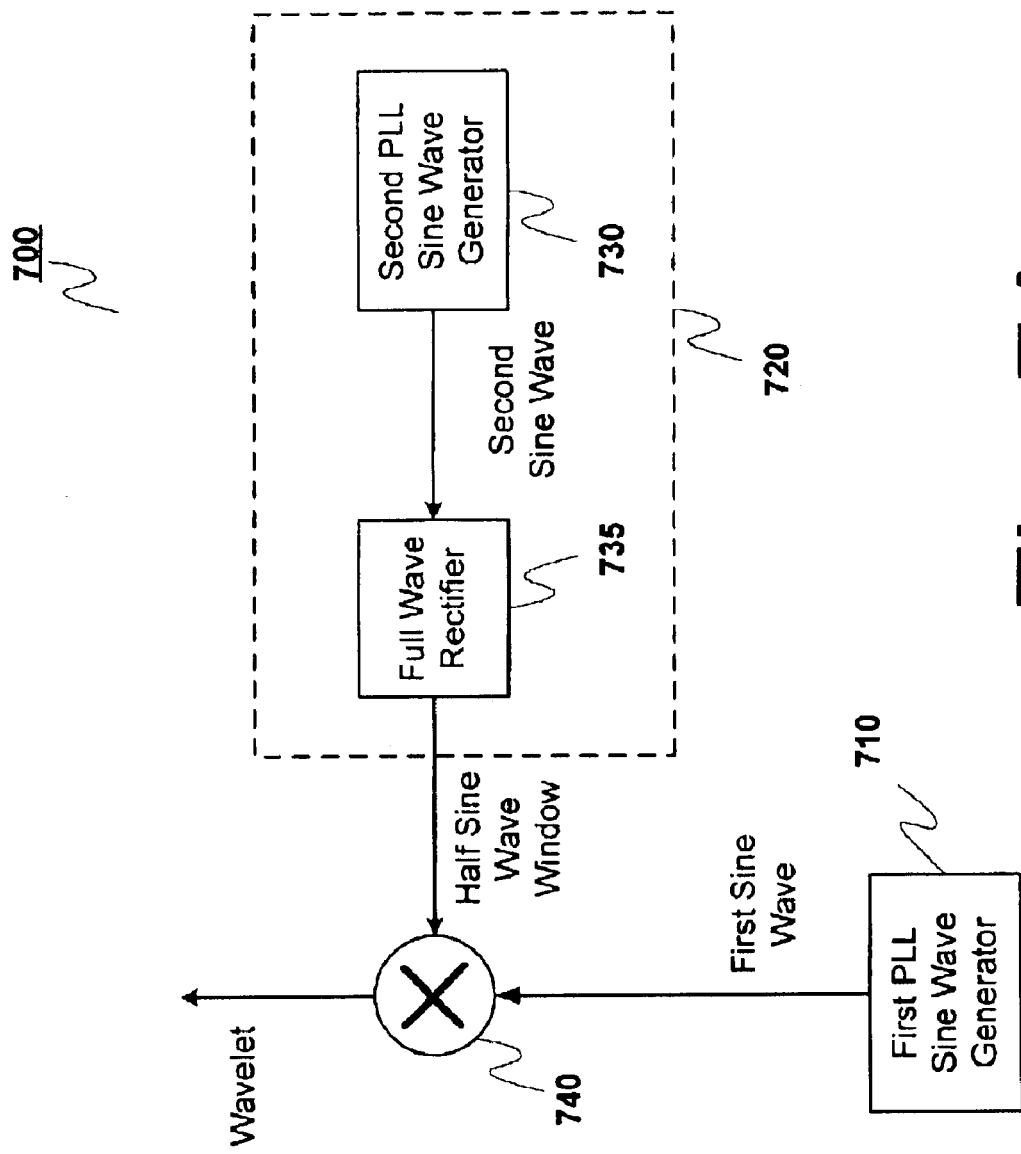
FIG. 7A is a block diagram showing a wavelet-generating circuit according to a preferred embodiment of the present invention.

FIG. 7A is a block diagram showing a wavelet-generating circuit according to a preferred embodiment of the present invention. As shown in FIG. 7A, the wavelet generating circuit 700 includes a first sine wave generator 710, a half sine wave window generator 720, and a first mixer 740. The half sine wave window generator 720 includes a second sine wave generator 730 and a full wave rectifier (FWR) 735. Although this embodiment shows a circuit that produces a series of wavelets, alternate embodiments could easily provide a single wavelet at a time.

The first sine wave generator 710 provides a sine wave at a first frequency. In this preferred embodiment, the first sine wave generator 710 is a phase lock loop (PLL) oscillator. The first sine wave output by the first sine wave generator 710 is provided to both the first mixer 740 and the divide by N circuit 750.

The half sine wave window generator 730 provides a signal including a series of half sine wave windows at a window frequency. Each half sine wave window corresponds to either a sine wave from 0 degrees to 180 degrees, or an inverse sine wave from 180 degrees to 360 degrees.

In the preferred embodiment of FIG. 7A, the half sine wave window generator 720 includes a second sine wave generator 730 and a full wave rectifier (FWR) 735. The second sine wave generator 730 is preferably a PLL oscillator that can generate a second sine wave at a second frequency. In the preferred embodiments of the present invention, the second sine wave generator 730 operates at $$\frac{1^{th}}{K}$$

the frequency of the first sine wave generator 710. In preferred embodiments, K is 4 or 6. However, in alternate embodiments K could be any real number above 1.

Thus, the window frequency, i.e., the frequency at which the half sine wave windows are provided, is twice the second frequency (which corresponds to $$\frac{2}{K}$$

times the first frequency). This is because for each 360 degrees of phase of the second sine wave, the full wave rectifier 735 provides two half sine wave windows.

Figure 8:
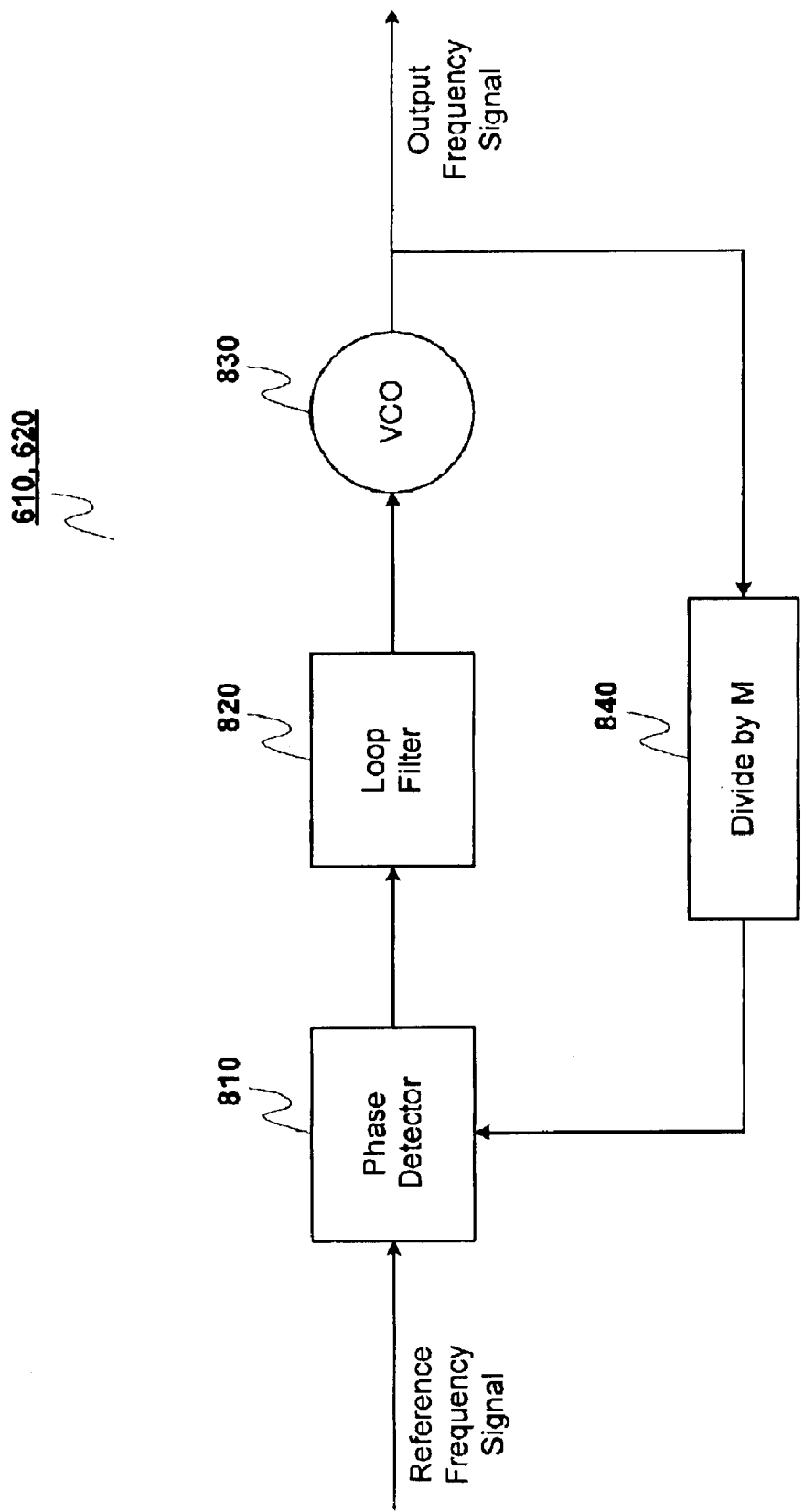
FIG. 8 is a block diagram of a sine wave generating circuit according to a preferred embodiment of the present invention.

FIG. 8 is a block diagram of a sine wave generating circuit according to a preferred embodiment of the present invention. As shown in FIG. 8, the sine wave generating circuit can be used as the first or second sine wave generator 710 or 720 of FIG. 7A. This sine wave generating circuit includes a phase detector 810, a loop filter 820, a GHz voltage controlled oscillator (VCO) 830, and a divide by M circuit 840.

The phase detector 810 measures the phase misalignment (i.e., the difference between zero crossing points) of the reference frequency signal and the feedback frequency signal, and generates a signal proportional to the phase misalignment.

The loop filter 820 generates a steady-state DC voltage (or a very stable, slowly varying AC voltage) based on the misalignment signal from the phase detector 810. This steady-state DC voltage represents the average phase difference between the feedback frequency signal and the reference frequency signal.

The voltage-controlled oscillator (VCO) 830 generates a sine wave with a desired output frequency. The VCO 830 adjusts the phase and frequency of the output sine wave based on the steady-state DC voltage it receives from the loop filter 820.

And the divide by M circuit 840 takes the output frequency signal and adjusts its frequency to match that of the reference frequency signal. As such, M can be any number required to make such a conversion.

In alternate embodiments the second sine wave generator 730 could receive the first sine wave as an input and use a divide by K circuit in place of the divide by M circuit 840. In this case, second sine wave generator will receive the first sine wave at the first frequency, divide the frequency of the first sine wave by K, and filter it to provide a second sine wave at a second frequency $$\frac{1^{th}}{K}$$

the first frequency.

The full wave rectifier 735 takes the second sine wave output from the second sine wave generator 730 and converts the negative portions of the second sine wave to equivalent positive portions, outputting a fully rectified second sine wave. This rectified sine wave forms a series of half sine wave windows that are output at a window frequency that is twice the second frequency.

In alternate embodiments, however, different methods can be used to create the half sine wave window. For example, two sine wave generators operating at the second frequency, but 180 degrees out of phase from each other could be alternately selected to provide the appropriate half sine wave windows.

The first mixer 740 multiplies the first sine wave output from the first sine wave generator 710 with the half sine wave window (i.e., the fully rectified second sine wave) output from the full wave rectifier 735 to provide a wavelet.

Figure 7B:
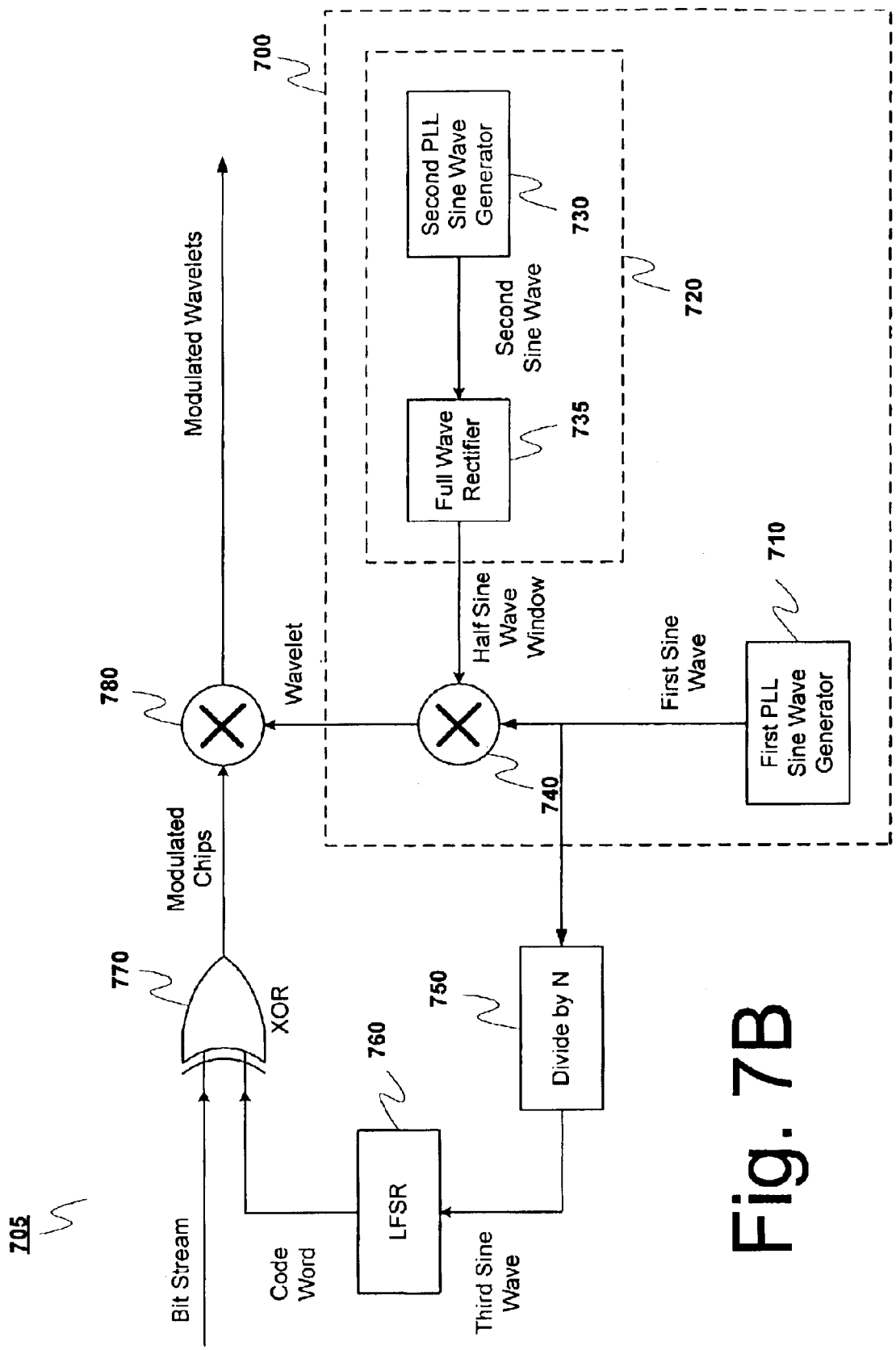
FIG. 7B is a block diagram showing a correlator circuit in a receiver according to a preferred embodiment of the present invention.

FIG. 7B is a block diagram showing a correlator circuit in a receiver according to a preferred embodiment of the present invention. This is shown to provide an example of where a wavelet generating circuit 700 could be used. However, in alternate embodiments, wavelet-generating circuits 700 can be used wherever wavelets are needed. For example, a transmitter could use a wavelet-generating circuit 700 to generate the wavelets that and encoded and transmitted.

As shown in FIG. 7B, the correlator circuit 705 includes a wavelet generating circuit 700, a divide by N circuit 750, a linear feedback shift register (LFSR) 760, an XOR gate 770, and a second mixer 780. The wavelet generating circuit 700 includes a first sine wave generator 710, a half sine wave window generator 720, and a first mixer 740, and the wavelet generating circuit 700 operates as described above with respect to FIG. 7A.

The divide by N circuit 750 receives the first sine wave output from the first sine wave generator 710 and divides its frequency by N, outputting a third sine wave having the frequency of the first sine wave. This sets the relationship between the stable frequency (i.e., the frequency provided at the first sine wave generator 710) and the chipping rate (i.e., the frequency of the chips that make up a code word used to encode data). In this embodiment that relationship is that the stable frequency is $$\frac{1^{th}}{N}$$

the chipping rate. In preferred embodiments N is 2 or 3. However in alternate embodiments, N is preferably equal to $$\frac{K}{2}.$$

This allows one half of a the frequency of the rectified second sine wave to define the separation between wavelets.

The LFSR 760 receives the third sine wave output from the divide by N circuit 750 and outputs a code word to the XOR gate 770 to encode information. The output of the LFSR 760 is a series of chips that preferably each have a binary value. In other words, each chip has either a +1 or −1 value. The chips are formed into code words having one or more chips each, and the code words are used to encode data.

The duration of each of the chips should be the duration of the half sine wave window output from the half sine wave generator 720. Otherwise, as data was processed, the correlator 705 would process chips at some fractional rate, i.e., either a fraction above or a fraction below one chip at a time, which would not function properly.

Figure 9:
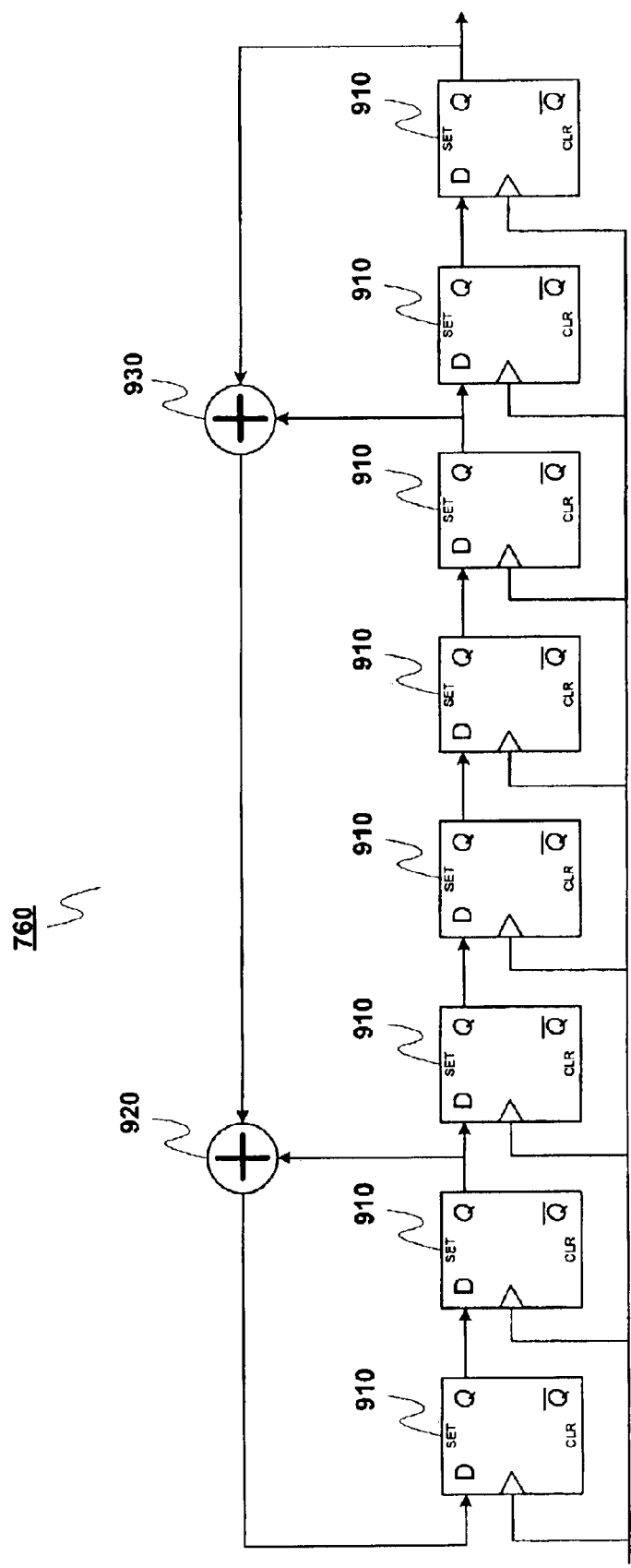
FIG. 9 is a block diagram of a LFSR 760 according to a preferred embodiment of the present invention.

FIG. 9 is a block diagram of a LFSR 760 according to a preferred embodiment of the present invention. As shown in FIG. 9, the LFSR 760 includes a plurality of flip-flops 910, and first and second adders 920 and 930.

The plurality of flip-flops 910 are connected in series and are clocked by the third sine wave. In this embodiment 8 flip-flops 910 are used to create a code word of length 255, depending upon the feedback tap values. In alternate embodiments with F flip-flops 910, a code word of up to ($2^F$−1) could be created. In one particular preferred embodiment a code length of 13 is used.

The XOR gate 770 performs an exclusive-or function with the chips output from the LFSR 760 and the bit stream. The output of the XOR gate 770 is thus a series of modulated chips, corresponding to a series of modulated code words. In other words if the code word is length J, the output of the XOR gate 770 can be split into J-chip modulated code words.

The XOR gate 770 outputs modulated chips at a chipping rate of $$\frac{1^{th}}{N}$$

the frequency of the first sine wave (in chips per second). The preferred unit for chipping rate is in chips per second (cps), i.e., how many chips (wavelets) are output by the XOR gate 770 every second. For very fast networks, units of Mcps (Mega chips per second) or Gcps (Giga chips per second) can be used.

In contrast, the bit stream is provided to the XOR gate 770 at a frequency equal to $$\frac{1^{th}}{J}$$

the chipping rate (where J is the code word length). In other words, the LFSR 760 provides a series of J chips (i.e., a code word) to the XOR gate 770 for each bit supplied to the XOR gate 770.

Although in this preferred embodiment the modulation is performed using the LFSR 760 and the XOR gate 770 to modulate the bit stream into chips, alternate embodiments could use different circuitry. For example, the chips could have ternary values, i.e., each chip has one of a +1, 0, or −1 value. In this case circuitry should be provided that would encode the necessary +1, 0, or −1 values onto the bit stream. In this embodiment the code words can be made with chips having ternary values, or the chips could have binary values (+1 and −1) and the 0 value could be used to separate chips or code words.

The second mixer 780 multiplies the output of the first mixer 740 (i.e., the series of wavelets) with the output of the XOR gate 770 (i.e., the series of modulated chips) to provide a series of modulated wavelets. Since the series of modulated chips are arranged into J-chip code words, the series of modulated wavelets is similarly arranged into J-wavelet code words. In one such an embodiment a rotating memory could be used, for example, to output the ternary values for encoding the bit stream.

In order to have the second mixer 780 operate properly, the zero crossing phases of the chips in the code word and the zero crossing phases of the rectified second sine wave should be aligned. The rectified second sine wave (half sine wave window) defines the parameters of the wavelet output from the first mixer 740. And thee phase parameter of the wavelet should match that of the code words output from the LFSR 760 for proper correlation to occur.

In one preferred embodiment the frequency of the first sine wave generator is 5 GHz, the frequency of the second sine wave generator is 1.25 GHz, and N is 2 (providing a chipping rate of 2.5 Gcps). Alternate embodiments are possible as long as the frequency of the third sine wave is twice the frequency of the second sine wave, the rate of incoming bits of data is equal to the rate of incoming wavelets multiplied by the length of the code word, and the zero crossing phase alignment of the bit stream and the rectified second sine wave are synchronized.

Figure 10:
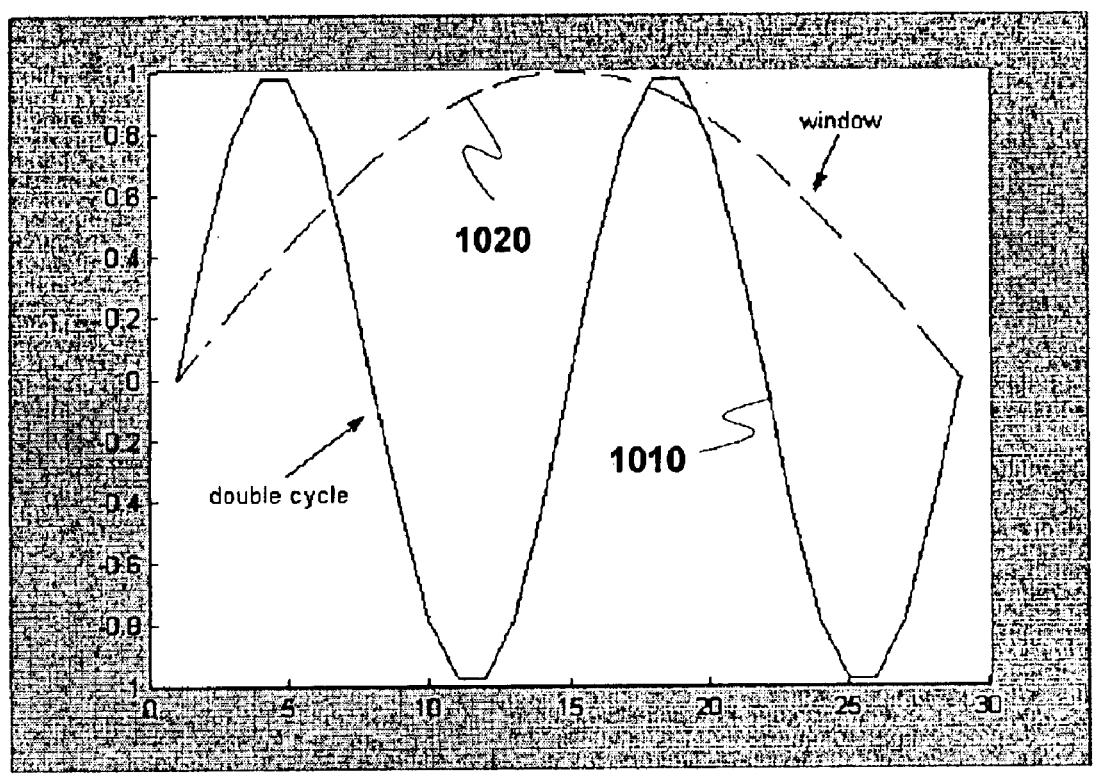
FIG. 10 is a graph showing the first sine wave and the rectified second sine wave received at the first mixer in the circuit of FIGS. 7A and 7B, according to a preferred embodiment of the preferred invention.
Figure 11A:
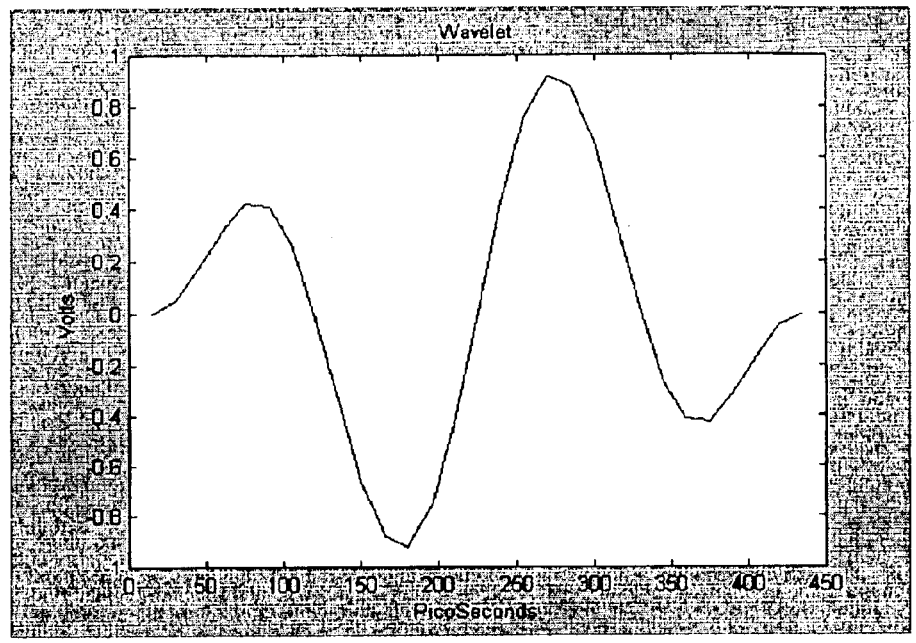
FIG. 11A is a graph showing the wavelet output from the first mixer in the circuit of FIGS. 7A and 7B, according to a preferred embodiment of the preferred invention.
Figure 11B:
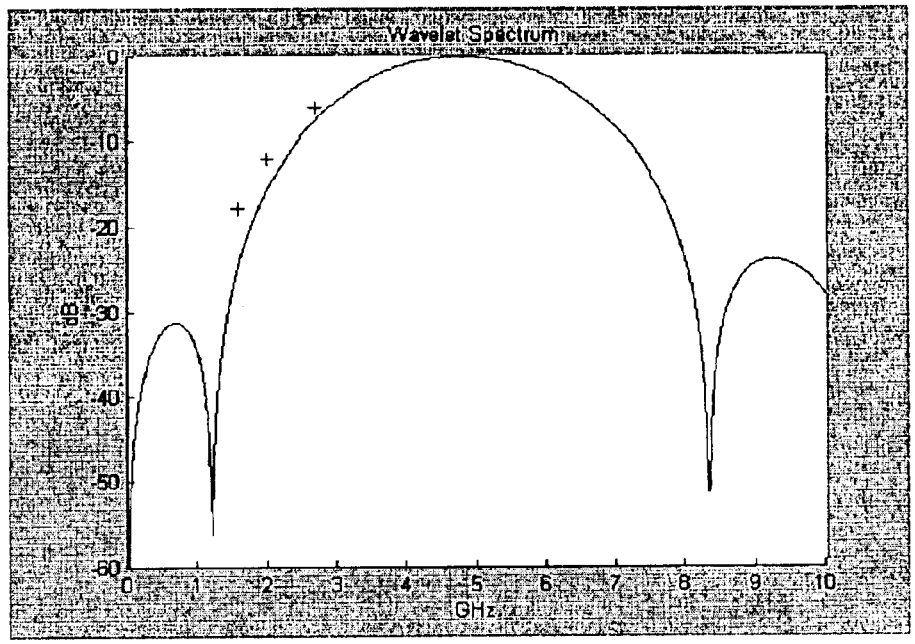
FIG. 11B is a graph showing the frequency response of the wavelet shown in FIG. 11A.

FIG. 10 is a graph showing the first sine wave and the rectified second sine wave received at the first mixer in the circuit of FIGS. 7A and 7B, according to a preferred embodiment of the preferred invention. In this embodiment the frequency of the first sine wave is 5 GHz and the frequency of the second sine wave is 1.25 GHz. FIG. 11A is a graph showing the wavelet output from the first mixer in the circuit of FIGS. 7A and 7B, according to a preferred embodiment of the preferred invention. And FIG. 11B is a graph showing the frequency response of the wavelet shown in FIG. 11A.

As shown in FIGS. 7A, 7B, and 10, the first mixer 740 receives the first sine wave 1010 and the half sine wave window 1020. The half sine wave window 1020 preferably has the same waveform as the first sine wave 1010, except that it is fully rectified and will be repeated at $$\frac{1}{W}$$

times the frequency of the first sine wave 1010 (where W is the number of cycles of the first sine wave used to form the wavelet). This means that a single half sine wave window 1020 will cover W full cycles (including partial cycles if W is not an integer) of the first sine wave 1010.

When the first sine wave 1010 and the half sine wave window 1020 are multiplied in the first mixer, their product will form the wavelet shown in FIG. 11A. This is a reasonably close approximation of the third derivative Gaussian wavelet shown in FIG. 1A.

As shown in FIG. 11B, the frequency response of the wavelet of FIG. 11A and frequency response of the wavelet of FIG. 1A are similar. The primary difference is that the frequency stable wavelet of FIG. 11A has side lobes about 3.5 GHz on either side of a maximum point. The side lobes vary in amplitude and location as the value of K (and thus N) is varied. In an environment where the spectral density of UWB signals is restricted (e.g., in the United States, where the Federal Communications Commission has imposed restrictions), the spectral placement and amplitude of the side lobes must be monitored for compliance. Additional discrete filtering may be required in some embodiments if the side lobe response is unacceptable.

Furthermore, if the first and second sine wave generators 710 and 730 are phase lock looped (PLL), the temperature stability of the sine waves they generate will be based on the temperature stability of the crystal used for the reference frequency. This makes the generated sine waves very stable for changing temperature. The stability of the PLL output is determined by the stability of the reference frequency input. And the reference frequency of a chip is generally very stable, as is well known in the art.

Figure 5A:
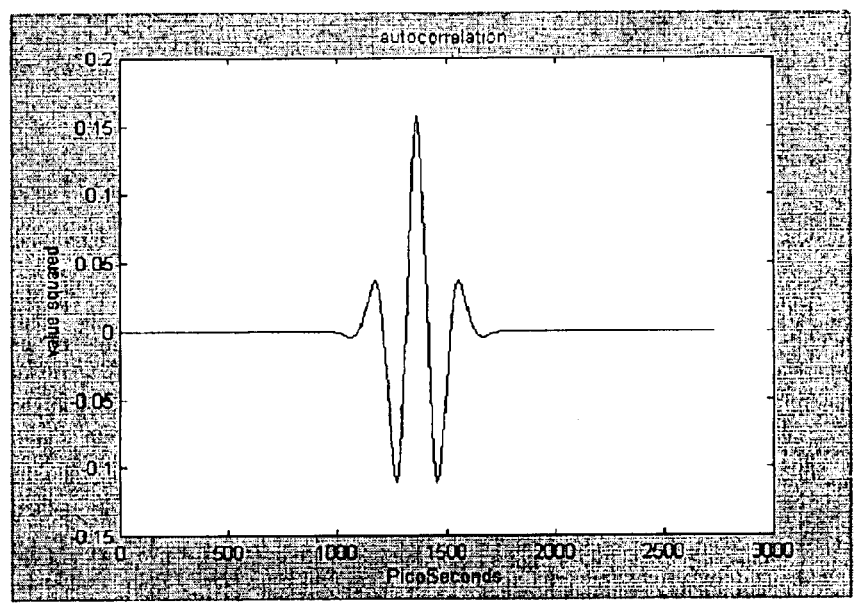
FIGS. 5A and 5B are graphs showing the autocorrelation function of the wavelet of FIG. 1A.
Figure 5B:
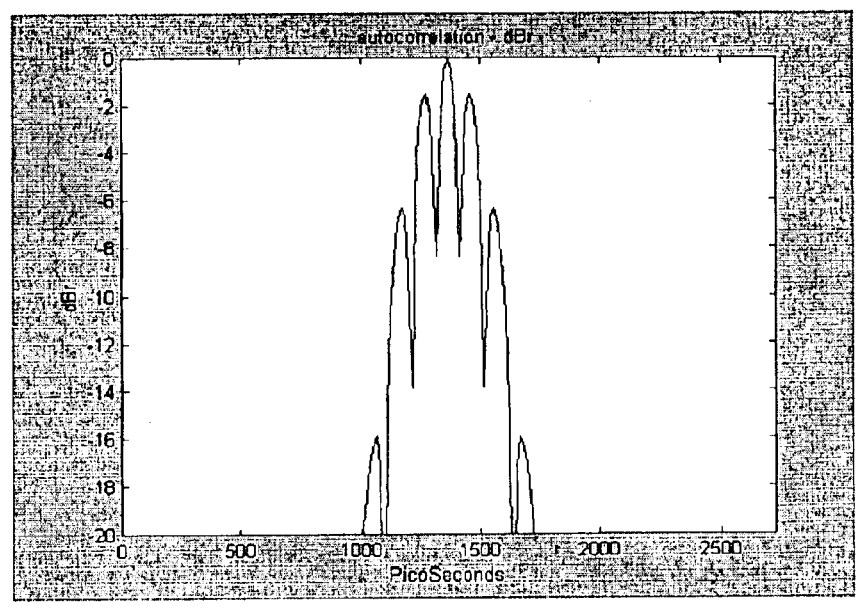
Figure 6:
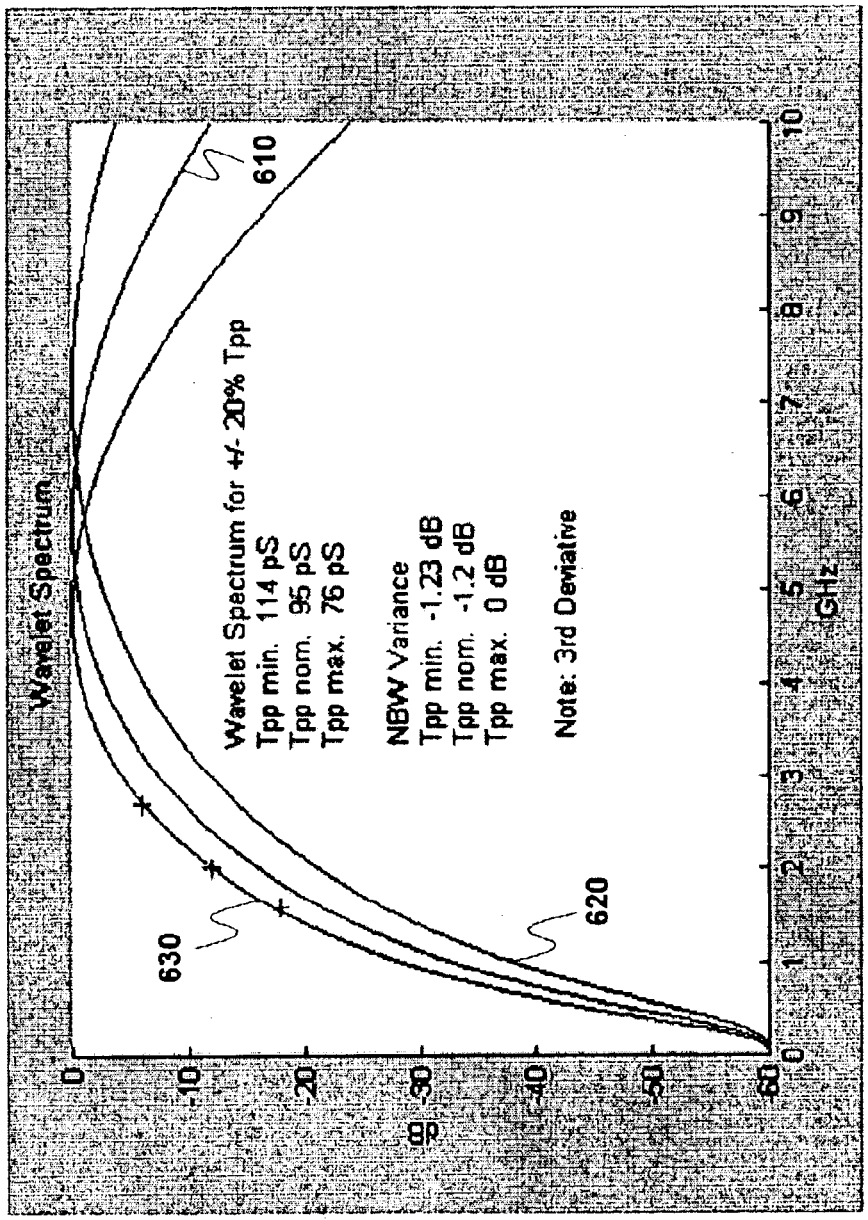
FIG. 6 is a graph showing the spectrum variance for the wavelet of FIG. 1A as its peak-to-peak time is varied.
Figure 12A:
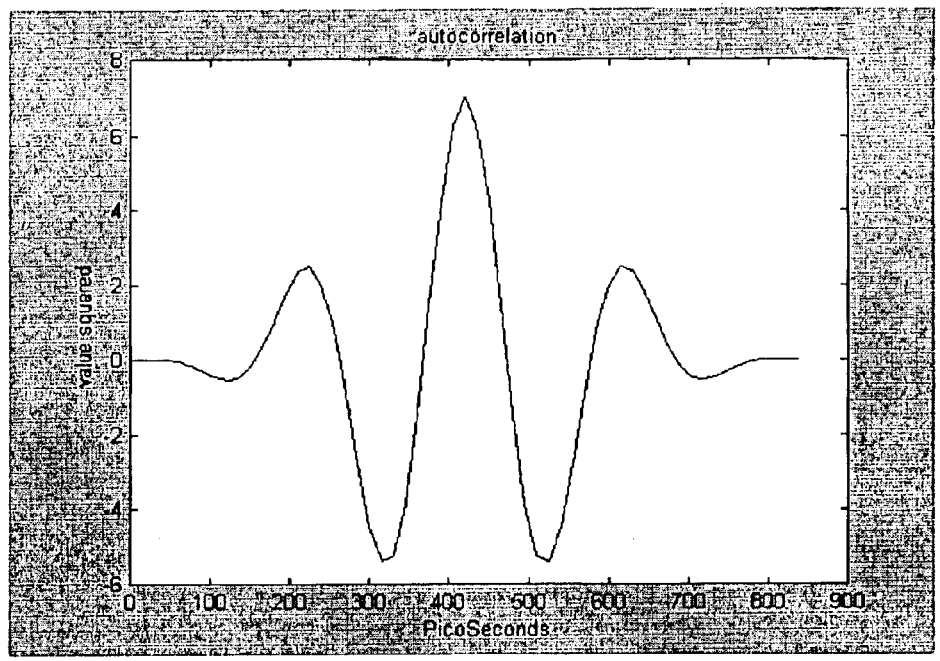
FIGS. 12A and 12B are graphs showing the autocorrelation function of the wavelet of FIG. 11A.
Figure 12B:
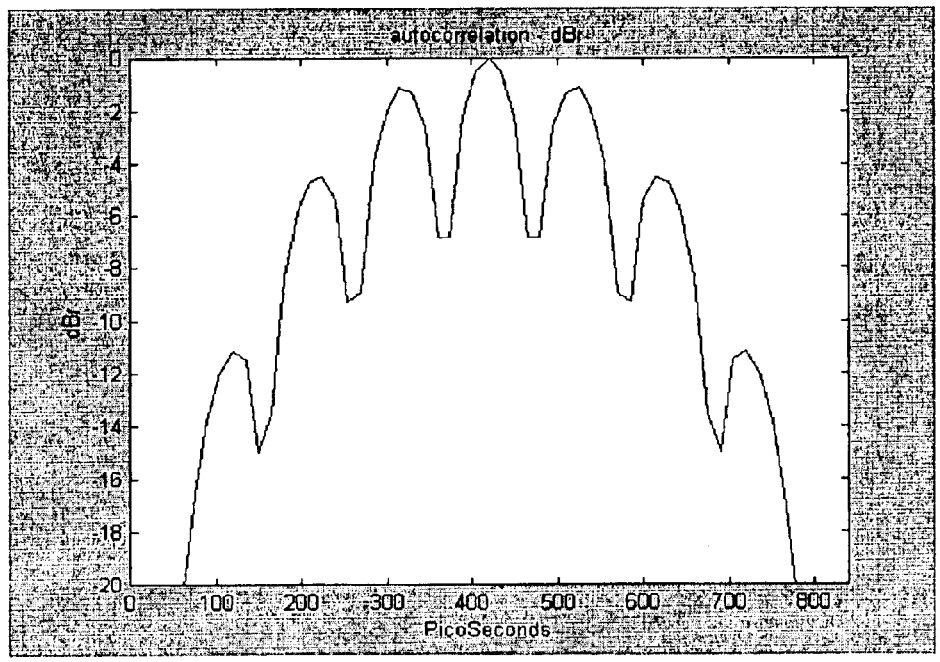

FIGS. 12A and 12B are graphs showing the autocorrelation function of the wavelet of FIG. 11A. FIG. 12A shows the autocorrelation in terms of amplitude, while FIG. 12B shows the autocorrelation in terms of dBr. A relative comparison to the graphs of FIGS. 5A and 5B can be made to determine whether performance is satisfactory.

One of the side benefits of generating wavelets using a technique that has frequency stability is the ability to more easily generate quadrature chips (i.e., two chips at a time) via techniques such as quadrature phase shift keying (QPSK) with a quadrature carrier. This allows either more powerful codes or 2 bits per code word.

Avoiding Linear Multiplications

In some situations, such as accost sensitive implementations, it would be advantageous to generate a wavelet without performing any linear multiplications. An alternate embodiment of the present invention provides a wavelet generating circuit that avoids linear multiplications. This would be advantageous because the complexity of design is reduced. However, this simplicity of design comes with a performance penalty in higher side lobe energy content. However, in some embodiments, reduced complexity may be more important than performance.

Figure 13A:
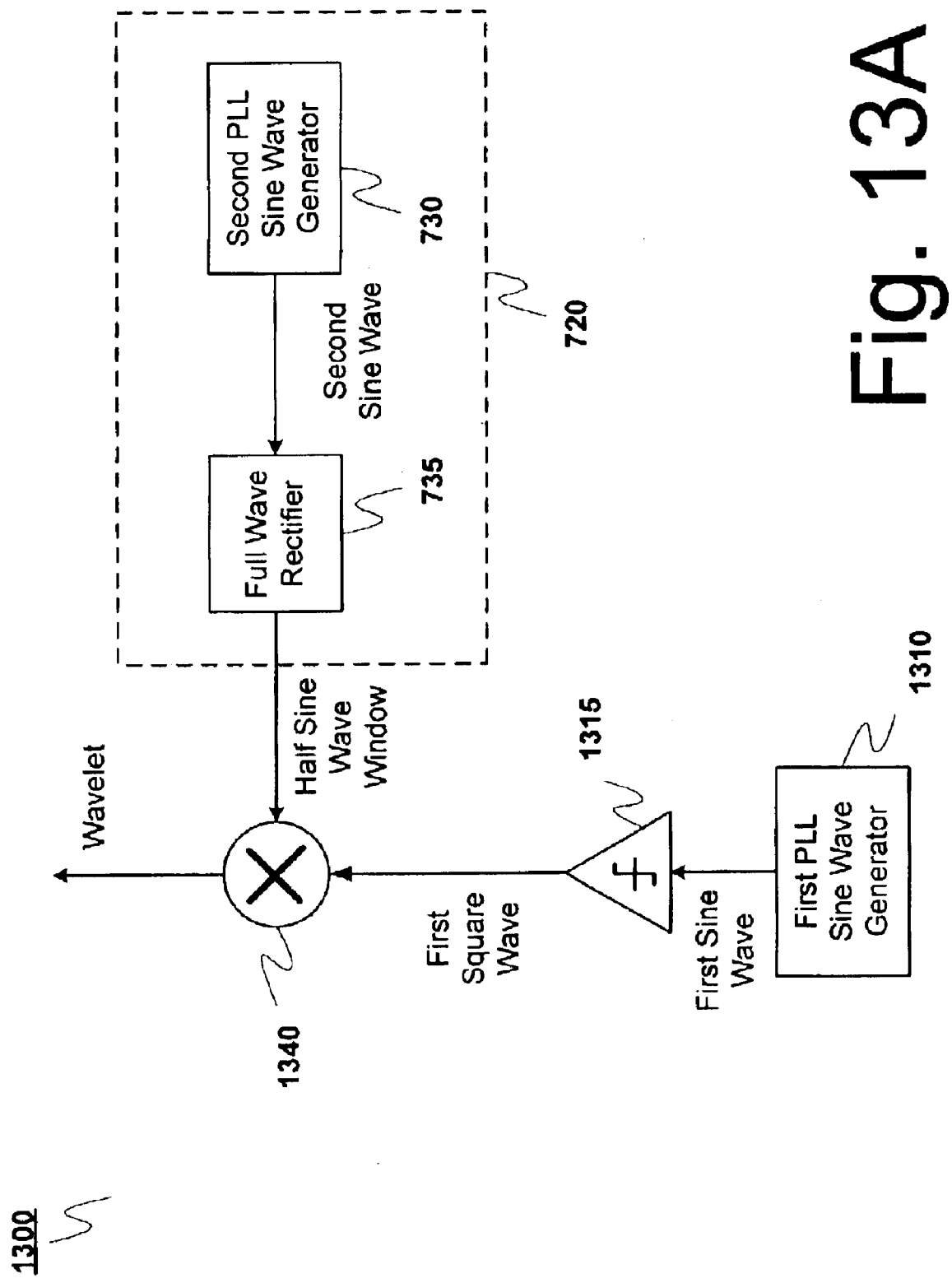
FIG. 13A is a block diagram showing a wavelet-generating circuit according to another preferred embodiment of the present invention.

FIG. 13A is a block diagram showing a wavelet-generating circuit according to another preferred embodiment of the present invention. As shown in FIG. 13A, the wavelet generating circuit 1300 includes a first sine wave generator 710, a limiter 1315, a half sine wave window generator 720, and a first mixer 1340. In this circuit, the elements that are comparable to those in FIG. 7A perform similar functions and their operation will not be described in detail.

A traditional multiplier (i.e., a traditional mixer) takes two linear inputs provides a linear output. However, a common way of building mixers, e.g., Gilbert cell mixers, is to have one linear port and one non-linear port. The linear port receives a linear signal; and the non-linear port receives a non-linear signal, which operates almost like a switching signal. Thus, the non-linear mixer performs only non-linear multiplication, i.e., it operates in a switching mode.

In the wavelet generating circuit 1300 of FIG. 13A, the limiter 1315 converts the first sine wave into a first square wave having the same frequency as the first sine wave.

The first mixer 1340 in this embodiment can be a non-linear mixer. The first mixer 1340 receives the half sine wave window (a linear signal) and the first square wave (a non-linear signal), and mixes the two to provide a wavelet.

However, because the first mixer 1340 receives the first square wave, rather than the first sine wave, the wavelets it outputs do not have a good shape. It therefore may be necessary to add further processing to achieve the desired level of system performance.

Figure 13B:
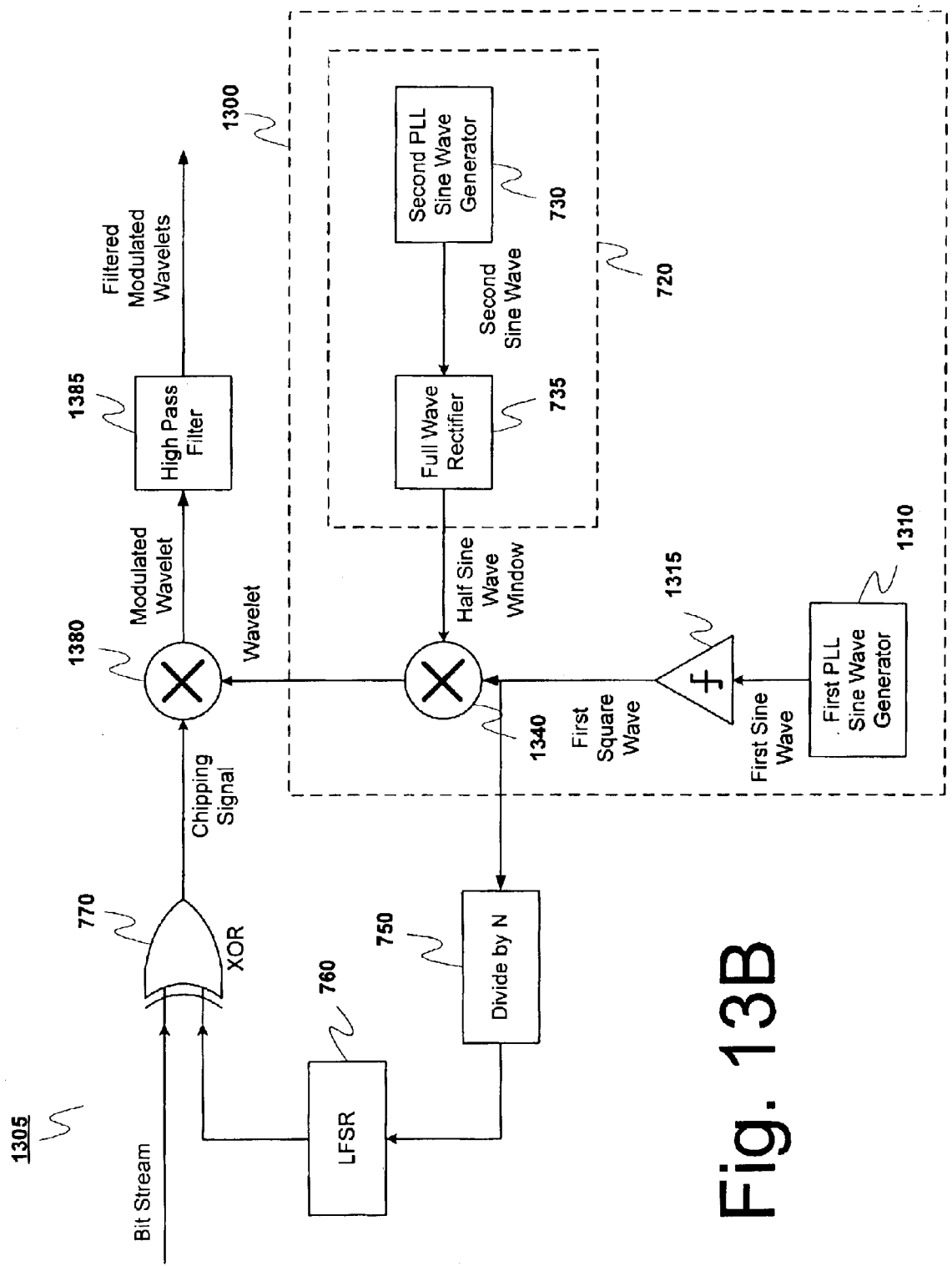
FIG. 13B is a block diagram showing a correlator circuit in a receiver according to a preferred embodiment of the present invention.

FIG. 13B is a block diagram showing a correlator circuit in a receiver according to a preferred embodiment of the present invention. This is shown to provide an example of where a wavelet generating circuit 1300 could be used. However, in alternate embodiments, wavelet-generating circuits 1300 can be used wherever wavelets are needed. For example, a transmitter could use a wavelet-generating circuit 1300 to generate the wavelets that and encoded and transmitted.

As shown in FIG. 13B, the correlator circuit 1305 includes a wavelet generating circuit 1300, a divide by N circuit 750, a linear feedback shift register (LFSR) 760, an XOR gate 770, a second mixer 1380, and a high pass filter 1385. The wavelet-generating circuit 1300 includes a first sine wave generator 710, a limiter 1315, a half sine wave window generator 720, a first mixer 1340, and the wavelet-generating circuit 1300 operates as described above with respect to FIG. 13A.

As noted above, because the first mixer 1340 receives the first square wave, rather than the first sine wave, the wavelets it outputs do not have a good shape. It is therefore necessary to add a high pass filter 1385 after the second mixer to reduce the output of band side lobe energy.

Figure 14:
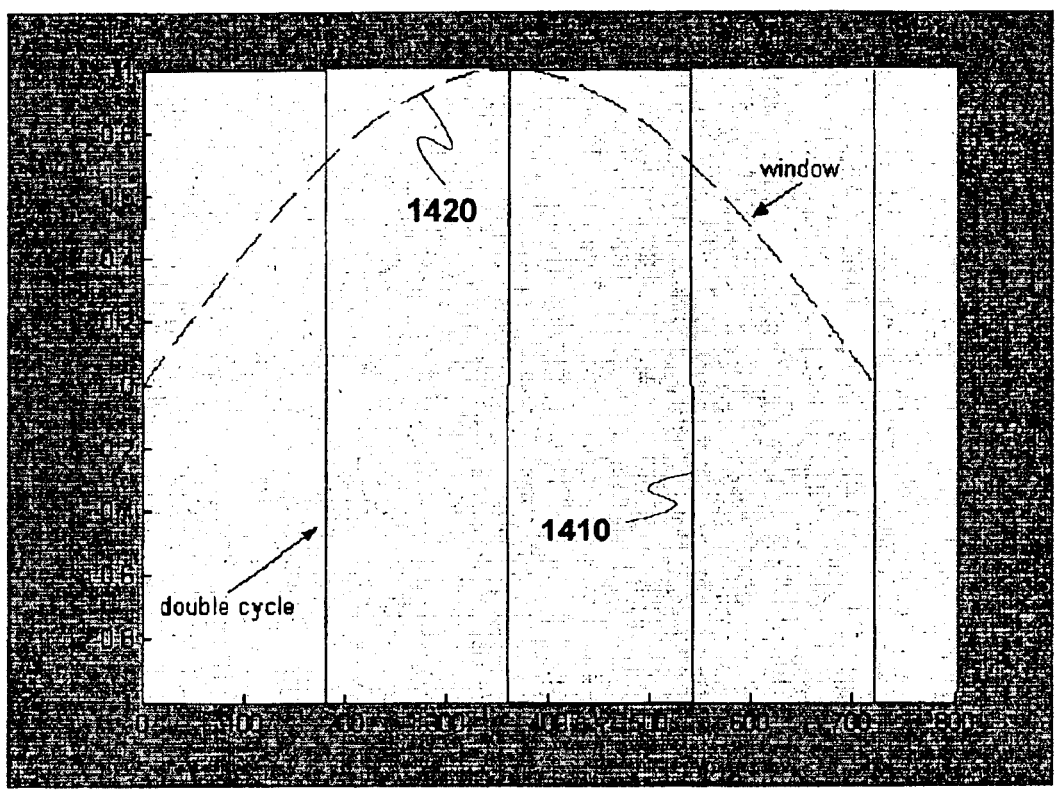
FIG. 14 is a graph showing the first square wave and the rectified second sine wave received at the first mixer in the circuit of FIGS. 13A and 13B, according to a preferred embodiment of the preferred invention.
Figure 15A:
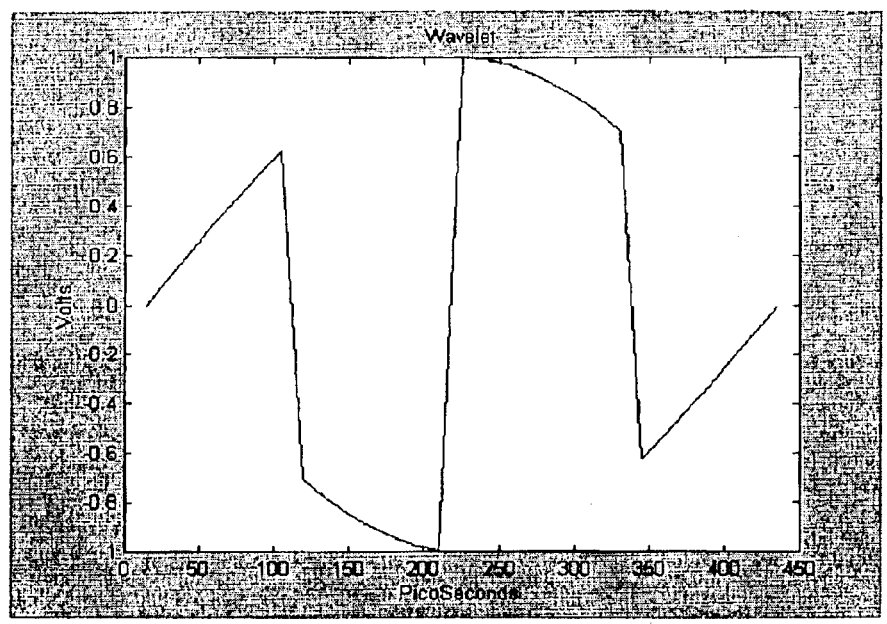
FIG. 15A is a graph showing the wavelet output from the first mixer in the circuit of FIGS. 13A and 13B, according to a preferred embodiment of the preferred invention.
Figure 15B:
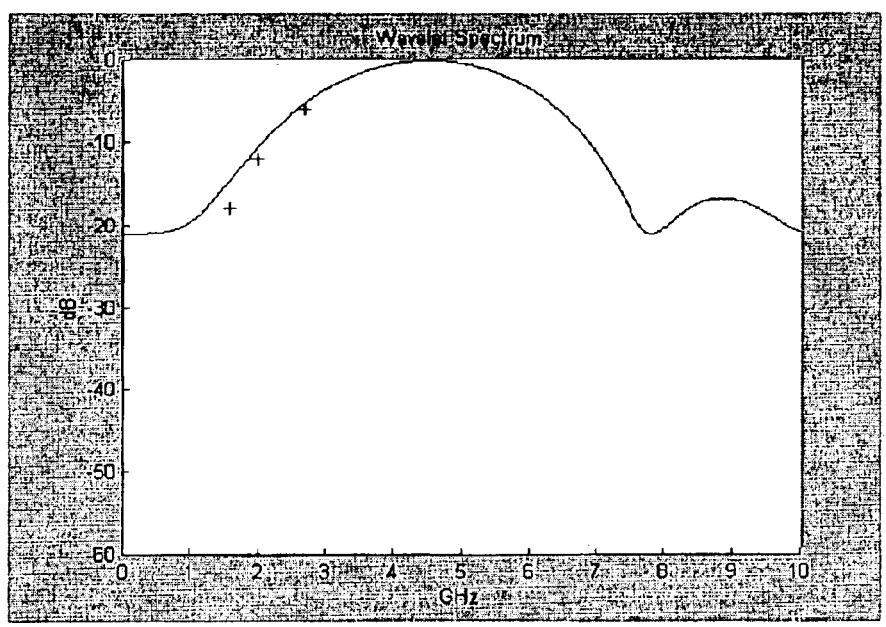
FIG. 15B is a graph showing the frequency response of the wavelet shown in FIG. 15A.

FIG. 14 is a graph showing the first square wave 1410 and the half sine wave window 1420 received at the first mixer in the circuit of FIGS. 13A and 13B, according to a preferred embodiment of the preferred invention. In this embodiment the frequency of the first sine wave generator is 5 GHz and the frequency of the second sine wave generator is 1.25 GHz. FIG. 15A is a graph showing the wavelet output from the first mixer in the circuit of FIGS. 13A and 13B, according to a preferred embodiment of the preferred invention. And FIG. 15B is a graph showing the frequency response of the wavelet shown in FIG. 15A.

As shown in FIGS. 13A, 13B, and 14, the first mixer 1340 receives the first square wave 1410 and the half sine wave window 1420. As with the embodiments of FIGS. 7A and 7B, the chips of the code word and the half sine wave window are preferably synchronized in phase such that they share zero crossing points on the time axis.

The half sine wave window 1420 preferably has the same waveform as the first sine wave from which the first square wave 1410 is formed, except that it is fully rectified and will be at $$\frac{1}{W}$$

times the frequency of the first sine wave (where W is twice the number of cycles of the first sine wave used to form the wavelet). This means that a single half sine wave window 1420 will cover W cycles (including partial cycles if W is not an integer) of the first square wave 1410.

When the first square wave 1410 and the half sine wave window 1420 are multiplied in the first mixer 1340, their product will form the wavelet shown in FIG. 15A. As shown in FIG. 15B, the frequency response of the wavelet of FIG. 15A is different from the frequency response of the wavelet of FIG. 1A. In particular, it does not drop off in power at frequencies higher and lower than the center frequency.

However, once the modulated wavelets are passed through the high pass filter 1385, their shape and behavior increases significantly, as shown in FIG. 16.

Figure 16A:
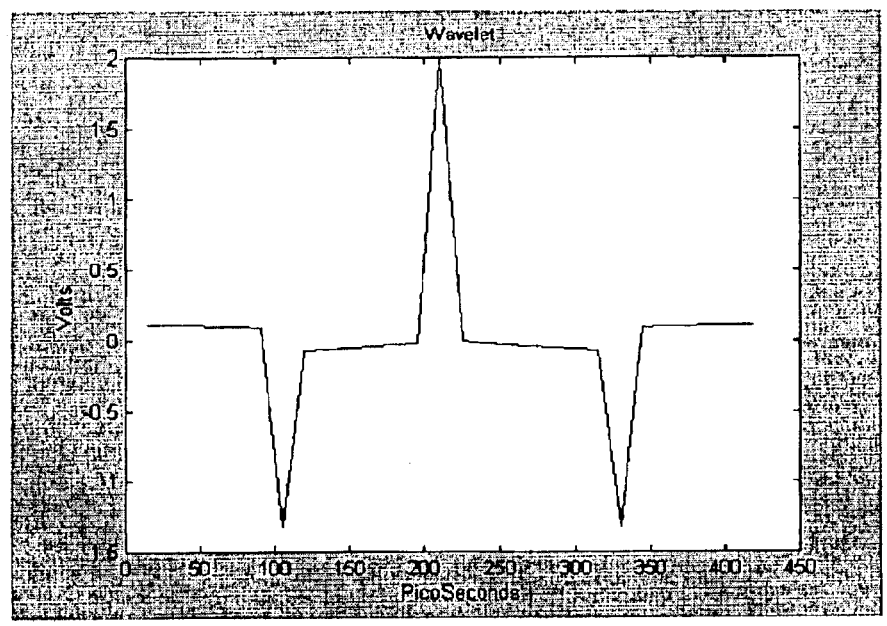
FIG. 16A is a graph showing a wavelet output from the high pass filter in the circuit of FIGS. 13A and 13B, according to a preferred embodiment of the preferred invention.
Figure 16B:
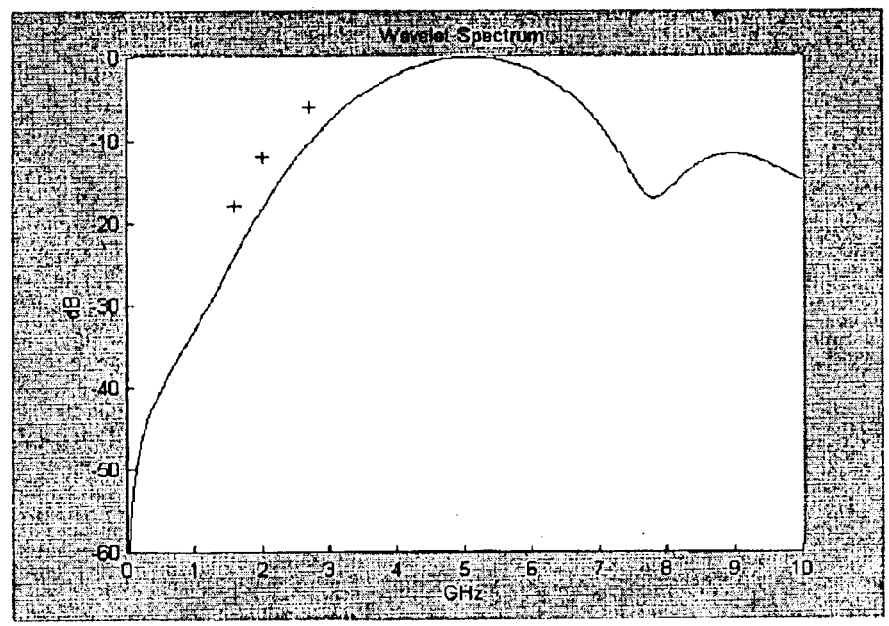
FIG. 16B is a graph showing the frequency response of the wavelet shown in FIG. 16A.

FIG. 16A is a graph showing a wavelet output from the high pass filter in the circuit of FIGS. 13A and 13B, according to a preferred embodiment of the preferred invention. And FIG. 16B is a graph showing the frequency response of the wavelet shown in FIG. 16A. As shown in FIGS. 16A and 16B, the wavelet after it passes through the high pass filter 1385 is closer in appearance and frequency response to the wavelet of FIG. 1A.

Figure 17A:
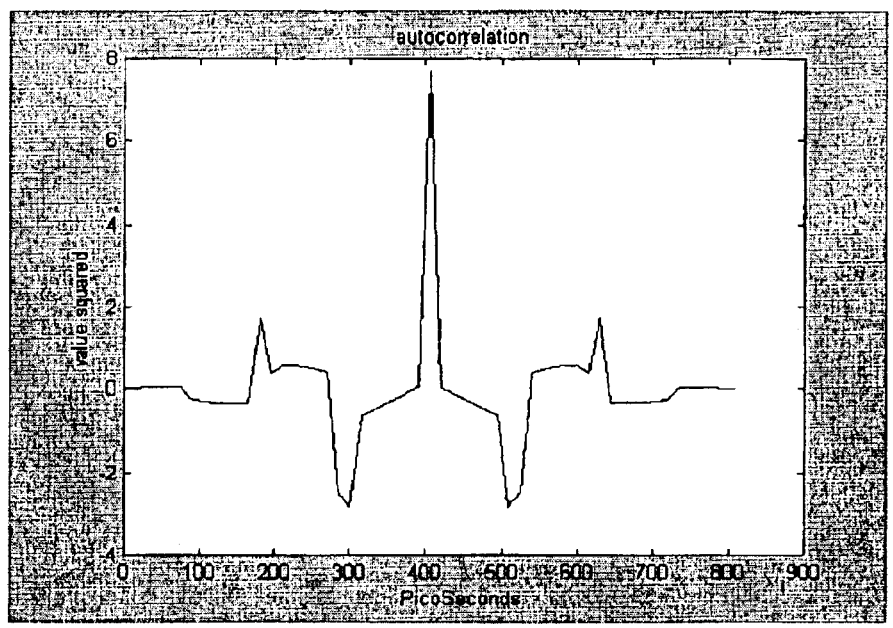
FIGS. 17A and 17B are graphs showing the autocorrelation function of the wavelet of FIG. 16A.
Figure 17B:
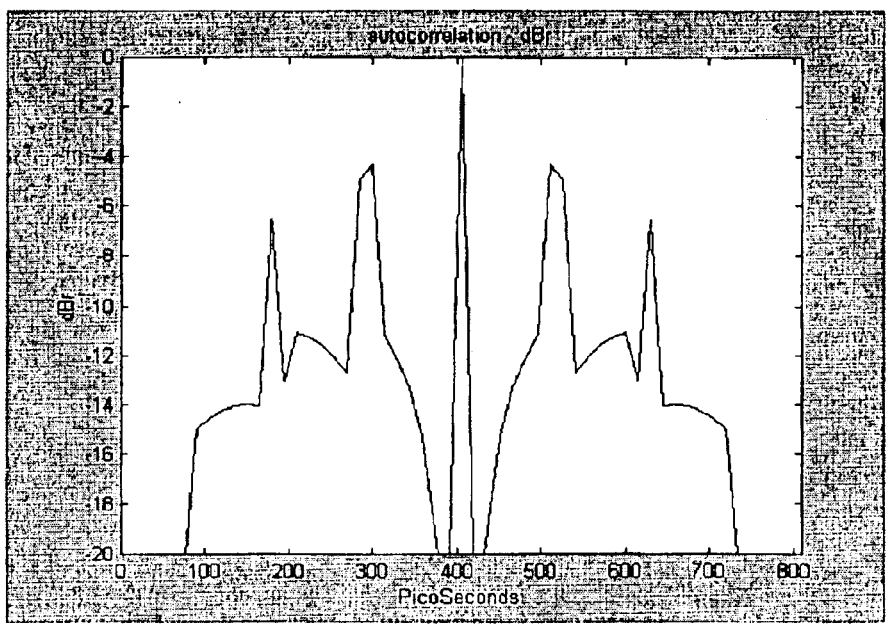

FIGS. 17A and 17B are graphs showing the autocorrelation function of the wavelet of FIG. 16A. FIG. 17A shows the autocorrelation in terms of amplitude, while FIG. 17B shows the autocorrelation in terms of dBr. Careful comparison should be made for any given implementation to ascertain whether the performance shown in FIGS. 17A and 17B are acceptable for the needs of that implementation.

Obviously, numerous modifications and variations of the present invention are possible in light of the above teachings. It is therefore to be understood that within the scope of the appended claims, the invention may be practiced otherwise than as specifically described herein.

We claim:

1. A method for generating a wavelet, comprising:
   generating a first sine wave having a first frequency;
   generating a half sine wave window having a window frequency; and
   mixing the first sine wave and the half sine wave window to produce a wavelet,
   wherein the window frequency is lower than the first frequency.

2. A method for generating a wavelet, as recited in claim 1, wherein the half sine wave window is a positive portion of a sine wave from 0 to 180 degrees.

3. A method for generating a wavelet, as recited in claim 1, wherein the half sine wave window is a negative portion of a sine wave from 180 to 360 degrees.

4. A method for generating a wavelet, as recited in claim 1, wherein the first frequency is between two and four times the window frequency.

5. A method for generating a wavelet, as recited in claim 4, wherein the first frequency is three times the window frequency.

6. A method for generating a wavelet, as recited in claim 1, wherein the step of generating a half sine wave window further comprises:
   generating a second sine wave having a second frequency; and
   fully rectifying the second sine wave to form the half sine wave window,
   wherein the second frequency is twice the window frequency.

7. A method for generating a wavelet, as recited in claim 1, wherein the first and second sine waves are each generated using a phase locked loop circuit.

8. A wavelet generator, comprising:
   a first sine wave generator for generating a first sine wave having a first frequency;
   a half sine wave window generator for generating a half sine wave window having a window frequency; and
   a mixer for mixing the first sine wave and the half sine wave window to produce a wavelet,
   wherein the window frequency is lower than the first frequency.

9. A wavelet generator, as recited in claim 8, wherein the first frequency is between two and four times the window frequency.

10. A wavelet generator, as recited in claim 9, wherein the first frequency is three times the window frequency.

11. A wavelet generator, as recited in claim 8, wherein the half sine wave window generator further comprises:
   a second sine wave generator for generating a second sine wave having a second frequency; and
   a full wave rectifier for fully rectifying the second sine wave to form the half sine wave window,
   wherein the second frequency is twice the window frequency.

12. A wavelet generator, as recited in claim 11, wherein the first and second sine wave generators are each phase locked loop circuits.

13. A method for generating wavelets, comprising:
   generating a first sine wave having a first frequency;
   generating a series of half sine wave windows, having a window frequency; and
   mixing the first sine wave and the half sine wave windows to produce a series of wavelets,
   wherein the window frequency is lower than the first frequency.

14. A method for generating wavelets, as recited in claim 13, wherein the first frequency is between two and four times the window frequency.

15. A method for generating wavelets, as recited in claim 14, wherein the first frequency is three times the window frequency.

16. A method for generating wavelets, as recited in claim 13, wherein the step of generating a half sine wave window further comprises:

generating a second sine wave having a second frequency; and fully rectifying the second sine wave to form the series of half sine wave windows, wherein the second frequency is twice the window frequency.

17. A method for generating wavelets, as recited in claim 13, wherein the first and second sine waves are each generated using a phase locked loop circuit.

18. A method for correlating incoming wavelets with locally generated wavelets, comprising:

generating a first sine wave having a first frequency;

generating a series of half sine wave windows, having a window frequency;

mixing the first sine wave and the half sine wave windows to produce a locally generated wavelet stream;

receiving an incoming wavelet stream; and mixing the locally generated wavelet stream with the incoming wavelet stream to generate a correlation value, wherein the window frequency is lower than the first frequency.

19. A method for generating wavelets, as recited in claim 18, wherein the first frequency is between two and four times the window frequency.

20. A method for generating wavelets, as recited in claim 19, wherein the first frequency is three times the window frequency.

21. A method for generating wavelets, as recited in claim 18, wherein the step of generating a half sine wave window further comprises:

generating a second sine wave having a second frequency; and fully rectifying the second sine wave to form the series of half sine wave windows, wherein the second frequency is twice the window frequency.

22. A method for generating wavelets, as recited in claim 21, wherein the first and second sine waves are each generated using a phase locked loop circuit.

23. A correlator, comprising:

a first sine wave generator for generating a first sine wave having a first frequency;

a half sine wave window generator for generating a series of half sine wave windows having a window frequency;

a first mixer for mixing the first sine wave and the series of half sine wave windows to produce a locally-generated wavelet stream; and a second mixer for mixing the locally generated wavelet stream with an incoming wavelet stream to generate a correlation value, wherein the second frequency is lower than the first frequency.

24. A correlator, as recited in claim 23, wherein the first frequency is between two and four times the window frequency.

25. A correlator, as recited in claim 24, wherein the first frequency is three times the window frequency.

26. A correlator, as recited in claim 23, wherein the half sine wave window generator further comprises:

a second sine wave generator for generating a second sine wave having a second frequency; and a full wave rectifier for fully rectifying the second sine wave to form the series of half sine wave windows, wherein the second frequency is twice the window frequency.

27. A correlator, as recited in claim 26, wherein the first and second sine waves are each generated using a phase locked loop circuit.

* * * * *

UNITED STATES PATENT AND TRADEMARK OFFICE
CERTIFICATE OF CORRECTION

PATENT NO. : 6,788,117 B2
DATED : September 7, 2004
INVENTOR(S) : Richard D. Roberts It is certified that error appears in the above-identified patent and that said Letters Patent is hereby corrected as shown below:

Column 16,
Lines 8-20, correct Claim 23 as:

23. A correlator, comprising:

a first sine wave generator for generating a first sine wave having a first frequency;

a second sine wave generator for generating a second sine wave having a second frequency;

a half sine wave window generator for generating a series of half sine wave windows having a window frequency;

a first mixer for mixing the first sine wave and the series of half sine wave windows to produce a locally-generated wavelet stream; and a second mixer for mixing the locally generated wavelet stream with an incoming wavelet stream to generated a correlation value, wherein the second frequency is lower than the first frequency.

Signed and Sealed this

Fourteenth Day of December, 2004

JON W. DUDAS
*Director of the United States Patent and Trademark Office*